United States Patent
Bernstein

(10) Patent No.: US 9,395,756 B1
(45) Date of Patent: Jul. 19, 2016

(54) TELESCOPIC PRIVACY-SCREEN FOR A LAPTOP/TABLET COMPUTER

(71) Applicant: Maria Bernstein, San Clemente, CA (US)

(72) Inventor: Maria Bernstein, San Clemente, CA (US)

( * ) Notice: Subject to any disclaimer, the term of this patent is extended or adjusted under 35 U.S.C. 154(b) by 0 days.

(21) Appl. No.: 14/659,712

(22) Filed: Mar. 17, 2015

(51) Int. Cl.
*G06F 1/16* (2006.01)

(52) U.S. Cl.
CPC ............ *G06F 1/1637* (2013.01); *G06F 1/1603* (2013.01)

(58) Field of Classification Search
USPC ......... 160/135, 223, 39, 38, 19; 359/601, 612
IPC .............................. G06F 1/1603,1/1607, 1/1611
See application file for complete search history.

(56) References Cited

U.S. PATENT DOCUMENTS

| | | | | |
|---|---|---|---|---|
| 2,501,133 A * | 3/1950 | Levy | ......................... | A47H 2/00 160/38 |
| 2,553,869 A * | 5/1951 | Purcell | ..................... | A47H 2/00 160/38 |
| 3,538,976 A * | 11/1970 | Jones | ..................... | E04B 2/7427 108/60 |
| 4,863,242 A * | 9/1989 | Correa | ..................... | H04N 5/65 348/834 |
| 4,928,465 A * | 5/1990 | Del Castillo Von Haucke | ................. | E04B 2/7437 160/135 |
| 5,218,474 A * | 6/1993 | Kirschner | ................ | H04N 5/65 348/842 |
| 5,717,566 A * | 2/1998 | Tao | ....................... | G06F 1/1603 348/834 |
| D397,686 S | 9/1998 | Bregman | | |
| 5,877,896 A | 3/1999 | Gremban | | |
| 5,988,582 A * | 11/1999 | Olivo | ................... | A47B 21/045 248/442.2 |
| 6,152,567 A * | 11/2000 | LaForgia | .............. | G06F 1/1601 359/601 |
| 6,302,546 B1 * | 10/2001 | Kordiak | ................ | G06F 1/1601 359/608 |
| 6,765,550 B2 | 7/2004 | Janick | | |
| 7,134,758 B1 * | 11/2006 | Baker | ................... | G06F 1/1603 348/842 |
| 7,505,256 B2 * | 3/2009 | Boudreau | ............ | G06F 1/1603 361/679.27 |
| 8,243,471 B2 * | 8/2012 | Liang | .................... | G06F 1/1603 361/807 |
| 8,328,372 B2 * | 12/2012 | Luo | ....................... | G06F 1/1603 359/601 |
| 8,477,493 B2 | 7/2013 | Wu | | |
| 2003/0223119 A1 * | 12/2003 | Heiman | ................... | A45C 3/02 359/610 |
| 2009/0268300 A1 * | 10/2009 | Dai | ......................... | H04N 5/65 359/601 |
| 2009/0296220 A1 * | 12/2009 | Aguilera | .............. | G06F 1/1603 359/601 |
| 2010/0026916 A1 * | 2/2010 | Lin | ....................... | G06F 1/1603 348/842 |
| 2010/0290122 A1 * | 11/2010 | Luo | ...................... | G06F 1/1603 359/601 |
| 2013/0015146 A1 | 1/2013 | Ibeawuchi | | |
| 2013/0341233 A1 | 12/2013 | Dow | | |

FOREIGN PATENT DOCUMENTS

WO   WO 2011037556   3/2011

* cited by examiner

*Primary Examiner* — David Purol
(74) *Attorney, Agent, or Firm* — Kyle A. Fletcher, Esq.

(57) ABSTRACT

The telescopic privacy screen for a laptop or tablet is a privacy device that prevents unauthorized viewing of the screens of computers. The telescopic privacy screen for a laptop or tablet provides two side wings that prevent the screen from being viewed from the side. The side wings are adjustable and can be moved when sharing information. The telescopic privacy screen for a laptop or tablet comprises a plurality of wings, a left end structure, a right end structure, one or more adjustment structures, a plurality of connecting rods, and a plurality of holes.

14 Claims, 6 Drawing Sheets

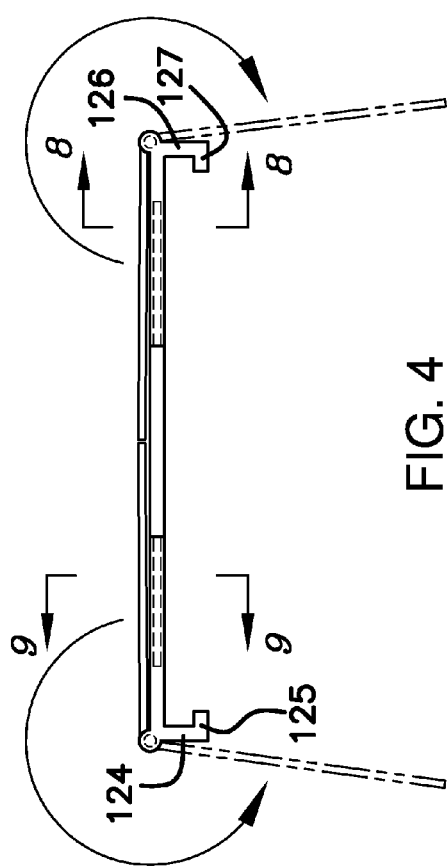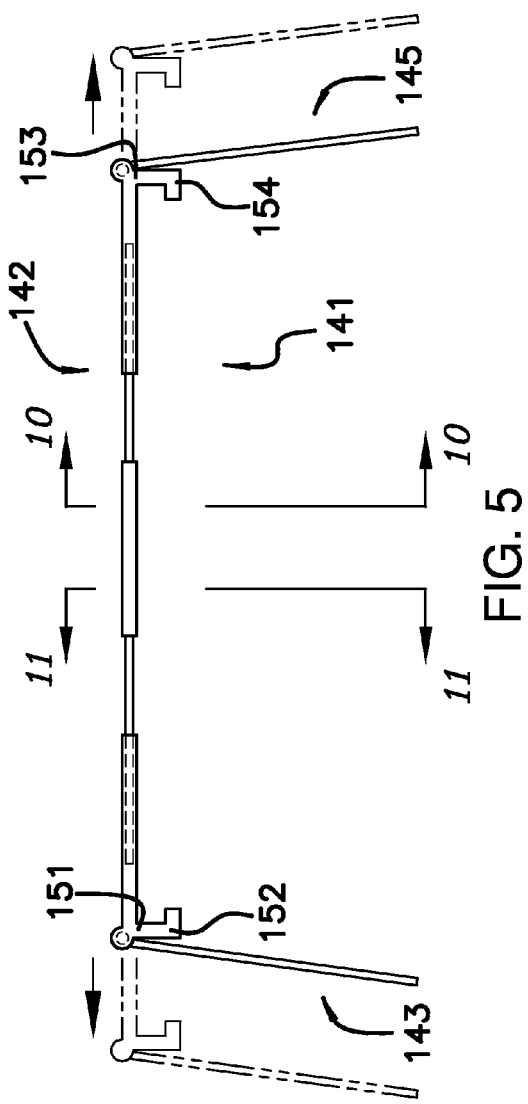

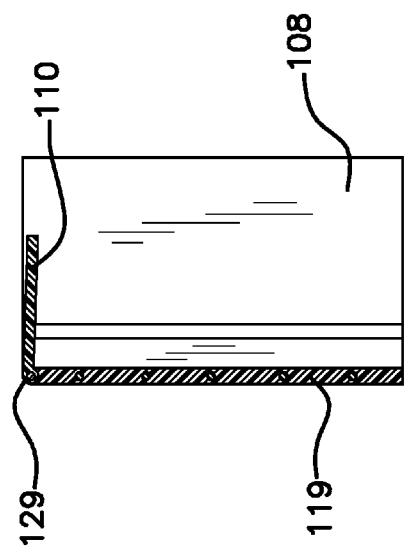
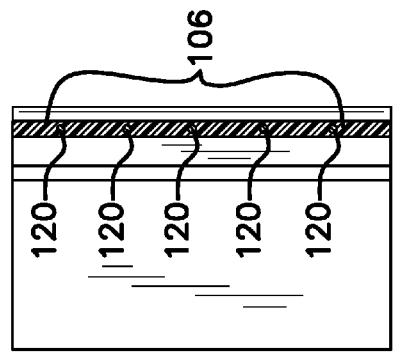
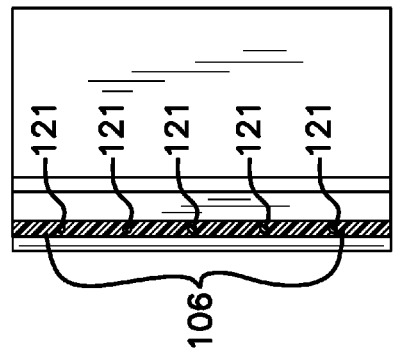

TELESCOPIC PRIVACY-SCREEN FOR A LAPTOP/TABLET COMPUTER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of data security and computer access control, more specifically, privacy screen configured to prevent unauthorized viewing of computer screens.

SUMMARY OF INVENTION

The telescopic privacy screen for a laptop or tablet is a privacy device that prevents unauthorized viewing of the screens of computers. The telescopic privacy screen for a laptop or tablet provides two side wings that prevent the screen from being viewed from the side. The side wings are adjustable and can be moved when sharing information. The telescopic privacy screen for a laptop or tablet comprises a plurality of wings, a left end structure, a right end structure, one or more adjustment structures, a plurality of connecting rods, and a plurality of holes.

These together with additional objects, features and advantages of the telescopic privacy screen for a laptop or tablet will be readily apparent to those of ordinary skill in the art upon reading the following detailed description of the presently preferred, but nonetheless illustrative, embodiments when taken in conjunction with the accompanying drawings.

In this respect, before explaining the current embodiments of the telescopic privacy screen for a laptop or tablet in detail, it is to be understood that the telescopic privacy screen for a laptop or tablet is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the telescopic privacy screen for a laptop or tablet.

It is therefore important that the claims be regarded as including such equivalent construction insofar as they do not depart from the spirit and scope of the telescopic privacy screen for a laptop or tablet. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 4 is a collapsed, top view of an embodiment of the disclosure.

FIG. 5 is an expanded, top view of an embodiment of the disclosure.

FIG. 7 is a cross-sectional view of an alternative embodiment of disclosure along line 7-7 in FIG. 6.

FIG. 8 is a detail of a right end of an embodiment of the disclosure.

FIG. 9 is a detail of a left end of an embodiment of the disclosure.

FIG. 10 is a detail of a second sub of an embodiment of the disclosure.

FIG. 11 is a detail of a first sub end of an embodiment of the disclosure.

DETAILED DESCRIPTION OF THE EMBODIMENT

Figure 1:
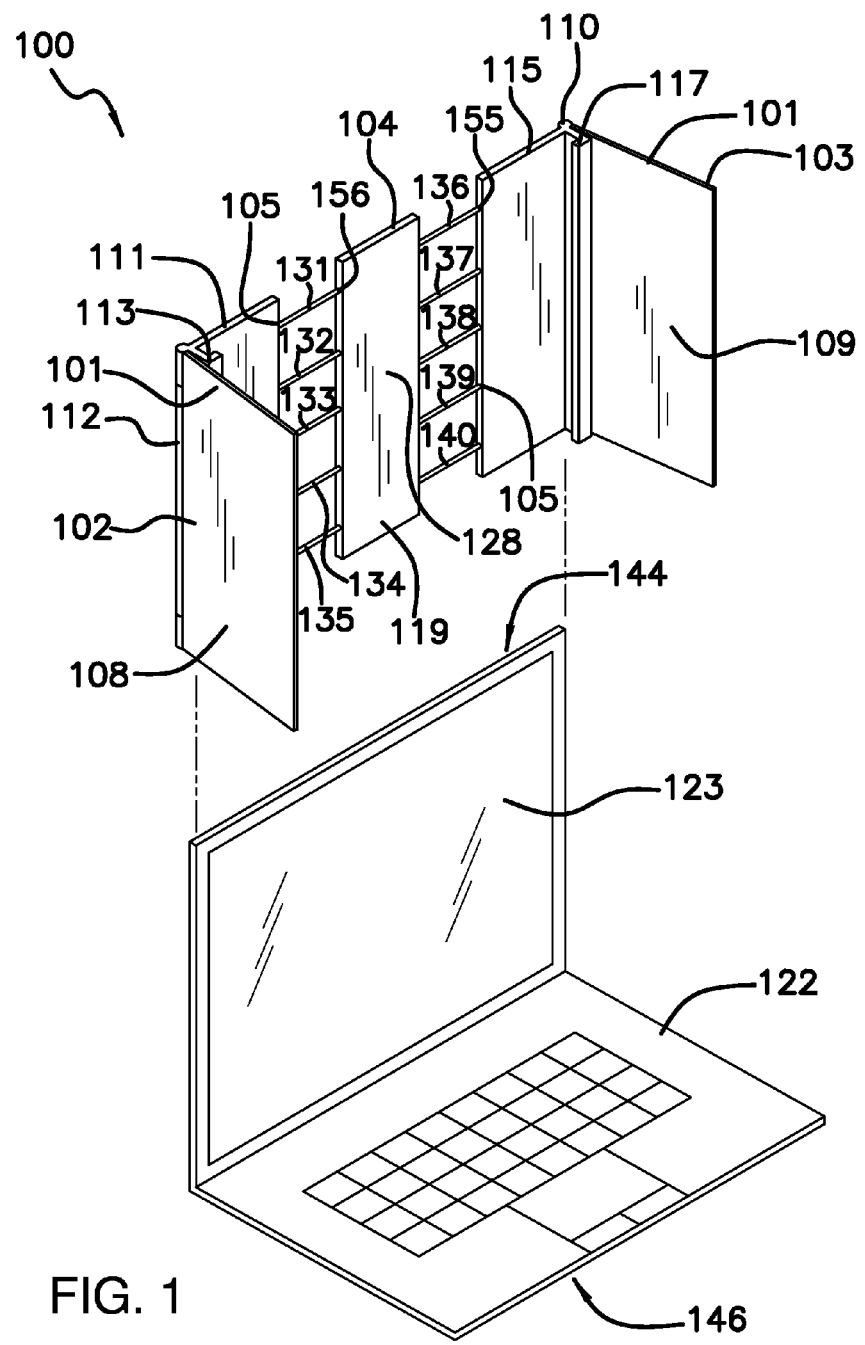
FIG. 1 is an exploded, perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to potential embodiments of the disclosure, which is illustrated in FIGS. 1 through 12. The telescopic privacy screen for a laptop or tablet 100 (hereinafter invention) comprises a plurality of wings 101, a left end structure 102, a right end structure 103, one or more adjustment structures 104, a plurality of connecting rods 105, and a plurality of holes 106.

The left end structure 102 comprises a left end panel 111, a left end hinge 112, a left end mounting clip 113, and a left end sub-plurality of holes 114. The left end panel 111 is rectangular in shape.

Formed into the left end panel 111 is the left end mounting clip 113. As most clearly shown in FIGS. 4 and 5, the left end mounting clip 113 comprises a left end projection 124 and a left end retaining clip 125. The left end projection 124 projects perpendicularly away from the front 141 face of the left end panel 111 towards the front 141 of the computer 122. The left end projection 124 is further defined by a first end 151 and a second end 152. The first end 151 of the left end projection 124 is joined to the left end panel 111. The left end retaining clip 125 projects away from the second 152 end of the left end projection 124 towards the right end structure 103. The span of the left end projection 124 and the shape and relative position of the left end retaining clip 125 are adapted to fit around the screen 123 of the computer 122 and serve to securely attach the invention 100 to the computer 122.

As shown most clearly in FIGS. 4 and 5, the left end hinge 112 is positioned at the corner where the left 143 side of the left end panel 111 and the back 142 side of the left end panel 111 join. The left end hinge 112 is used to attach a left wing 108 to the left end structure 102 and acts as the pivot point around which the position of the left wing 108 can be rotated. The left end hinge 112 has a range of motion of at least 250 degrees.

Formed into the right 145 side of the left end panel 111 is the left end sub-plurality of holes 114. Each of the holes from the left end sub-plurality of holes 114 is designed and sized to receive one of the plurality of connecting rods 105.

The right end structure 103 comprises a right end panel 115, a right end hinge 116, a right end mounting clip 117, and a right end sub-plurality of holes 118. The right end panel 115 is rectangular in shape.

Formed into the right end panel 115 is the right end mounting clip 117. As most clearly shown in FIGS. 4 and 5, the right end mounting clip 117 comprises a right end projection 126 and a right end retaining clip 127. The right end projection 126 projects perpendicularly away from the front 141 face of the right end panel 115 towards the front 141 of the computer 122. The right end projection 126 is further defined by a third end 153 and a fourth end 154. The third end 153 of the right end projection 126 is joined to the right end panel 115. The right end retaining clip 127 projects away from the fourth end 154 of the right end projection 126 towards the left end structure 102. The span of the right end projection 126 and the shape and relative position of the right end retaining clip 127 are adapted to fit around the screen 123 of the computer 122 and serve to securely attach the invention 100 to the computer 122.

As shown most clearly in FIGS. 4 and 5, the right end hinge 116 is positioned at the corner where the right 145 side of the right end panel 115 and the back 142 side of the right end panel 115 join. The right end hinge 116 is used to attach a right wing 109 to the right end structure 103 and acts as the pivot point around which the position of the right wing 109 can be rotated. The right end hinge 116 has a range of motion of at least 250 degrees.

Formed into the left 143 side of the right end panel 115 is the right end sub-plurality of holes 118. Each of the holes from the right end sub-plurality of holes 118 is designed and sized to receive one of the plurality of connecting rods 105.

Each of the one or more adjustment structures 104 comprises a center panel 128 that is formed with a first sub plurality of holes 120 and a second sub plurality of holes 121. The first sub-plurality of holes 120 is formed in the left 143 side of the center panel 128. The second sub-plurality of holes 121 is formed in the right 145 side of the center panel 128. Each of the holes from the first sub-plurality of holes 120 and the second sub-plurality of holes 121 is designed and sized to receive one of the plurality of connecting rods 105.

The plurality of holes 106 comprises the left end sub-plurality of holes 114, the right end sub-plurality of holes 118, and the first sub-plurality of holes 120 and the second sub-plurality of holes 121 of each of the one or more adjustment structures 104 included with the invention 100.

The purpose of the plurality of connection rods 105 is to attach the left end structure 102, the right end structure 103 and the one or more adjustment structures 104 together. Each of the plurality of connecting rods 105 is sized to fit into any hole selected from the plurality of holes 106. Each of the plurality of connecting rods 105 comprises a rod which is further defined with a fifth end 155 and a sixth end 156.

The following procedure is used to attach: 1) the left end structure 102 to one of the one or more adjustment structures 104; the right end structure 103 to one of the one or more adjustment structures 104; or, 3) a first selected adjustment structure from the one or more adjustment structures 104 to a second selected adjustment structure, which is different from the first selected adjustment structure, from the one or more adjustment structures 104. The fifth end 155 of each of the plurality of connecting rods 105 is inserted into a hole selected from a third sub-plurality of holes that is selected from the plurality of holes 106. The sixth end 156 of each of the plurality of connecting rods 105 is inserted into a hole selected from a fourth sub-plurality of holes, which is different from the third sub-plurality of holes, that is selected from the plurality of holes 106. The fifth end 155 and sixth end 156 of each of the plurality of connecting rods 105 is inserted into one of the plurality of holes 106 such that no two connecting rods cross over each other.

The purpose of the plurality of wings 101 is to reduce the visibility of the screen 123 of the computer 122 from the left 143 side and the right 145 side. The plurality of wings 101 comprises a left wing 108, a right wing 109 and an optional top wing 110.

The left wing 108 acts as a left blocking panel that reduces the visibility of the screen 123 of the computer 122 from the left 143 side. The back 142 edge of the left wing 108 is connected to the left end hinge 112 of the left end structure 102. The left wing 108 can be attached to the left end hinge 112 using commercially available hardware, or the back 142 edge of the left wing 108 can be formed with connectors that attach the left wing 108 directly to the left end hinge 112. The right wing 109 acts as a right blocking panel that reduces the visibility of the screen 123 of the computer 122 from the right 145 side. The back 142 edge of the right wing 109 is connected to the right end hinge 116 of the right end structure 103. The right wing 109 can be attached to the right end hinge 116 using commercially available hardware, or the back 142 edge of the right wing 109 can be formed with connectors that attach the right wing 109 directly to the right end hinge 116.

The optional top wing 110 acts as a top blocking panel that reduces the visibility of the screen 123 of the computer 122 from the top 144 side. The optional top wing 110 prevents people standing above the computer 122 from being able to look down and see the screen 123. When the optional top wing 110 is provided, at least one adjustment structure hinge 129 is added to one or more of: 1) the one or more of the adjustment structures 104; 2) the left end structure 102; or, 3) the right end structure 103. The adjustment structure hinge 129 is used to attach the optional top wing 110 to the adjustment structure 104 and acts as the pivot point around which the position of the optional top wing 110 can be rotated. The adjustment structure hinge 129 has a range of motion of at least 270 degrees. The optional top wing 110 can be attached to the adjustment structure hinge 129 using commercially available hardware, or the back 142 edge of the optional top wing 110 can be formed with connectors that attach the optional top wing 110 directly to the adjustment structure hinge 129.

The left wing 108, right wing 109, the optional top wing 110, left end structure 102, right end structure 103, and each of the one or more adjustment structures 104 can be made as individual units from molded plastic. Suitable plastics include, but are not limited to, polycarbonate or polyethylene.

Each of the plurality of connecting rods 105 can be made as individual units from molded plastic or from metal. Suitable plastics include, but are not limited to, polycarbonate or polyethylene. Suitable metals include, but are not limited to, aluminum.

A detailed description of the implementation of the first potential embodiment of the disclosure, as illustrated in FIGS. 1 through 5 and 8 through 11, will now be provided.

In the first potential embodiment of the disclosure, a first adjustment structure 119 is used as the one or more adjustment structures 104. The first adjustment structure 119 is formed with a first sub-plurality of holes 120 and a second sub-plurality of holes 121. The first sub-plurality of holes 120 comprises five holes. The second sub-plurality of holes 121 comprises five holes. The left end sub-plurality of holes 114 comprises five holes. The right end sub-plurality of holes 118 comprises five holes. The plurality of holes 106 comprises the left end sub-plurality of holes 114, the right end sub-plurality of holes 118, the first sub-plurality of holes 120 and the second sub-plurality of holes 121.

The plurality of connecting rods 105 comprises a first connecting rod 131, a second connecting rod 132, a third connecting rod 133, a fourth connecting rod 134, a fifth connecting rod 135, a sixth connecting rod 136, a seventh connecting rod 137, an eighth connecting rod 138, a ninth connecting rod 139 and a tenth connecting rod 140.

To assemble the first potential embodiment of the disclosure, the left wing 108 is attached to the left end hinge 112 and the right wing 109 is attached to the right end hinge 116. The fifth end 155 of the first connecting rod 131 is then inserted into a first hole selected from the left end sub-plurality of holes 114. The sixth end 156 of the first connecting rod 131 is then inserted into a first hole from first sub-plurality of holes 120. The fifth end 155 of the second connecting rod 132 is then inserted into a second hole selected from the left end sub-plurality of holes 114. The sixth end 156 of the second connecting rod 132 is then inserted into a second hole from first sub-plurality of holes 120. The fifth end 155 of the third connecting rod 133 is then inserted into a third hole selected from the left end sub-plurality of holes 114. The sixth end 156 of the third connecting rod 133 is then inserted into a third hole from first sub-plurality of holes 120. The fifth end 155 of the fourth connecting rod 134 is then inserted into a fourth hole selected from the left end sub-plurality of holes 114. The sixth end 156 of the fourth connecting rod 134 is then inserted into a fourth hole from first sub-plurality of holes 120. The fifth end 155 of the fifth connecting rod 135 is then inserted into a fifth hole selected from the left end sub-plurality of holes 114. The sixth end 156 of the fifth connecting rod 135 is then inserted into a fifth hole from first sub-plurality of holes 120. The fifth end 155 of the sixth connecting rod 136 is then inserted into a first hole selected from the right end sub-plurality of holes 118. The sixth end 156 of the sixth connecting rod 136 is then inserted into a first hole from second sub-plurality of holes 121. The fifth end 155 of the seventh connecting rod 137 is then inserted into a second hole selected from the right end sub-plurality of holes 118. The sixth end 156 of the seventh connecting rod 137 is then inserted into a second hole from second sub-plurality of holes 121. The fifth end 155 of the eighth connecting rod 138 is then inserted into a third hole selected from the right end sub-plurality of holes 118. The sixth end 156 of the eighth connecting rod 138 is then inserted into a third hole from second sub-plurality of holes 121. The fifth end 155 of the ninth connecting rod 139 is then inserted into a fourth hole selected from the right end sub-plurality of holes 118. The sixth end 156 of the ninth connecting rod 139 is then inserted into a fourth hole from second sub-plurality of holes 121. The fifth end 155 of the tenth connecting rod 140 is then inserted into a fifth hole selected from the right end sub-plurality of holes 118. The sixth end 156 of the tenth connecting rod 140 is then inserted into a fifth hole from second sub-plurality of holes 121.

After the invention 100 is assembled, the invention 100 is adjusted to fit the computer 122 by moving the positions of the left end structure 102, the right end structure 103 and the first adjustment structure 119 in a telescopic manner relative to each other until the mounting clips are aligned with the left 143 side of the screen 123 and the right 145 side of the screen 123. To use the invention 100, the mounting clips are slid over the left 143 side of the screen 123 and the right 145 side of the screen 123 and lowered into position so that the left wing 108 and right wing 109 will block the screen 123 from unauthorized viewing. When the user wants to share what is on the screen 123, the left wing 108 and right wing 109 can be rotated around the screen 123 using the left end hinge 112 and right end hinge 116 as the respective pivot points.

Figure 6:
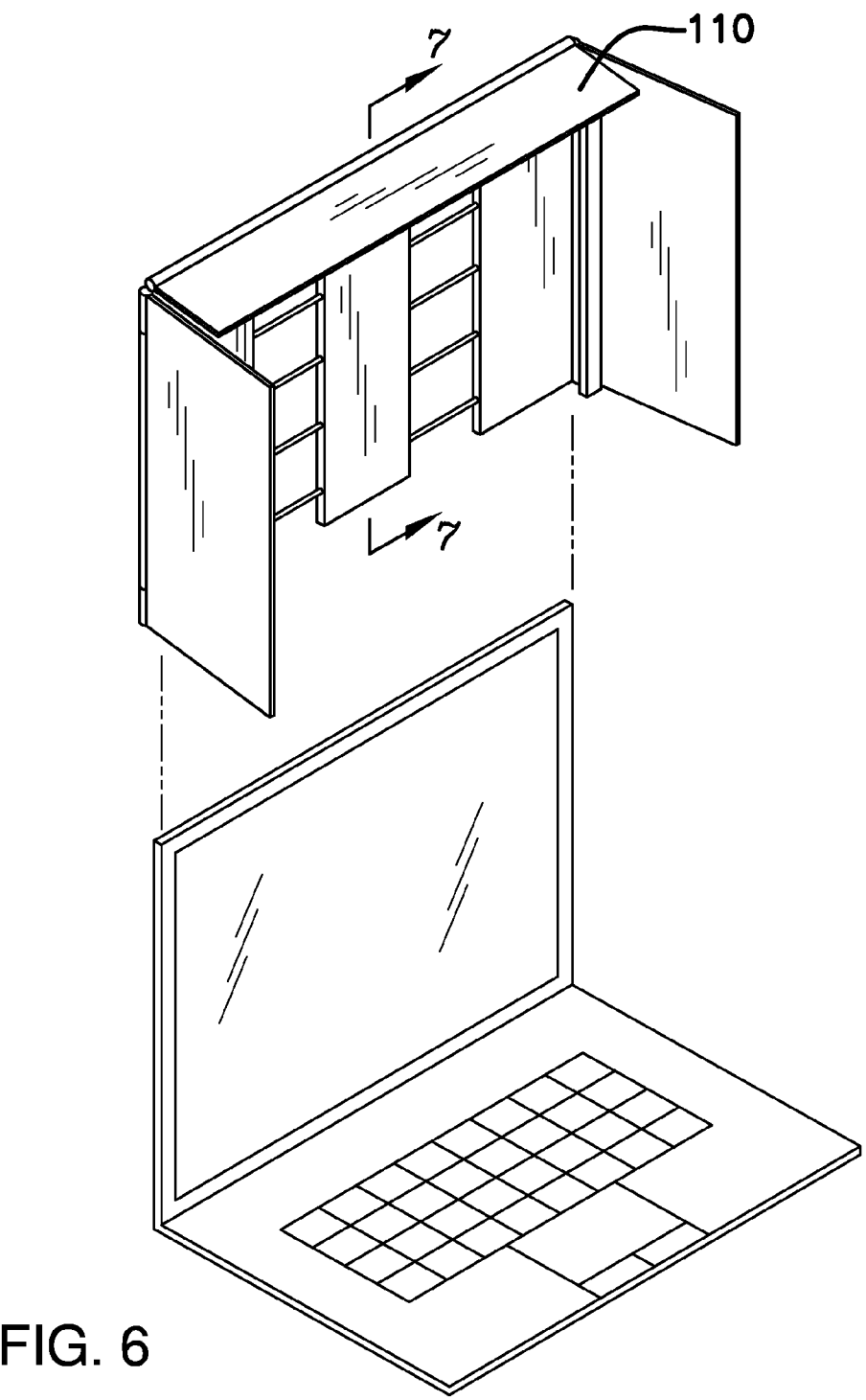
FIG. 6 is an exploded, perspective view of an alternative embodiment of the disclosure.

In a second potential embodiment of the disclosure, illustrated in FIGS. 6 and 7, an optional top wing 110 is provided. The second potential embodiment is identical to the first potential embodiment of the disclosure except, the optional top wing 110 is attached to the first adjustment structure 119 using an adjustment structure hinge 129.

Figure 12:
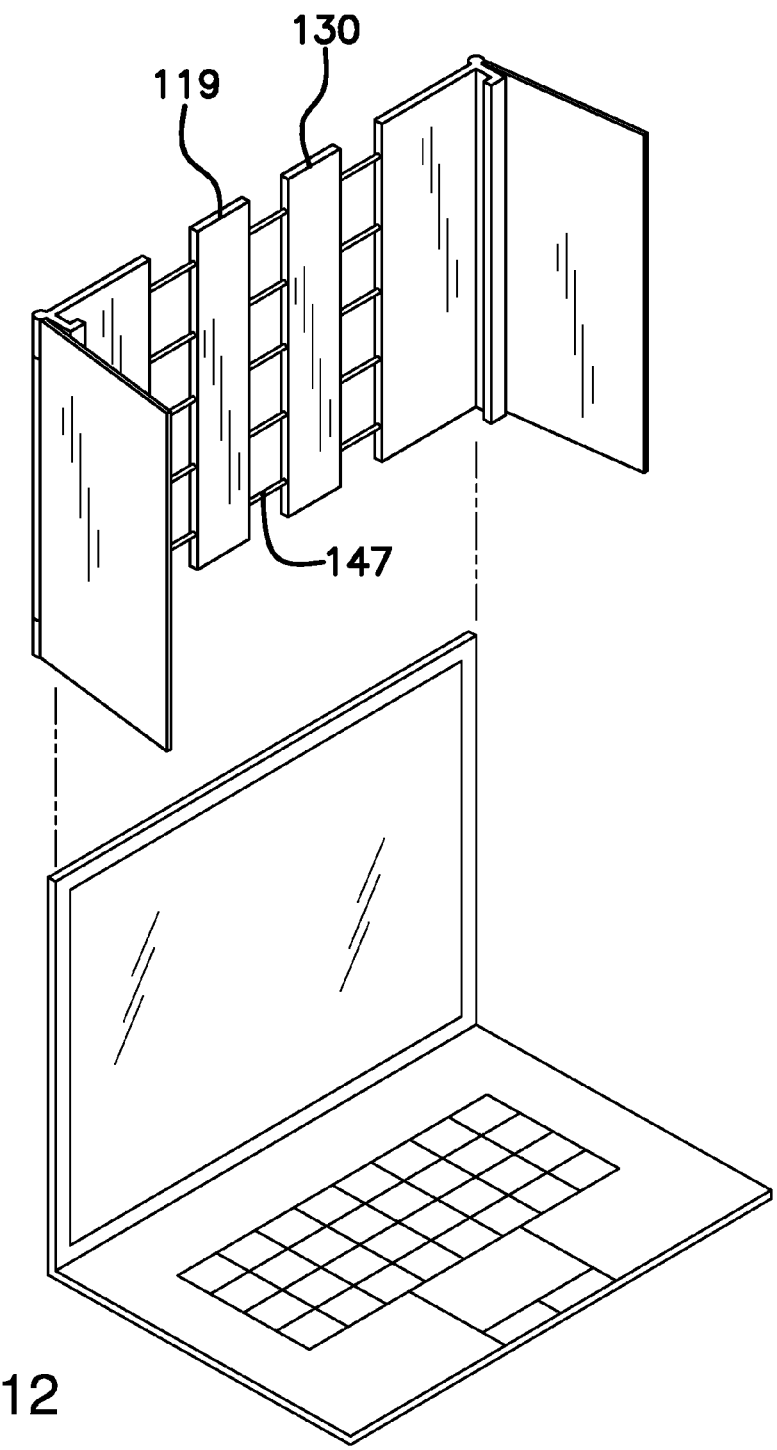
FIG. 12 is a perspective view of a third embodiment of the disclosure.

In a third potential embodiment of the disclosure, illustrated in FIG. 12, a second adjustment structure 130 and 5 additional connecting rods 147 are incorporated.

The following definitions and directional references were used in this disclosure:

Computer: As used in this disclosure, the term computer refers to a portable data processing devices and specifically includes laptop computers and tablets.

Directional References: The directional references used in this disclosure correspond to those of a viewer looking at the screen of a laptop computer or tablet. The display face of the screen corresponds to the front 141 side of the invention 100. The face distal to the front 141 face is the back 142 side of the invention 100. When the viewer is viewing the front 141 face, the left 143 side of the invention 100 is on the viewer's left. When viewing the front 141 face, the remaining sides of the invention 100, going clockwise starting from the left 143 side, are called the top 144 side, the right 145 side, and the bottom 146 side.

Figure 2:
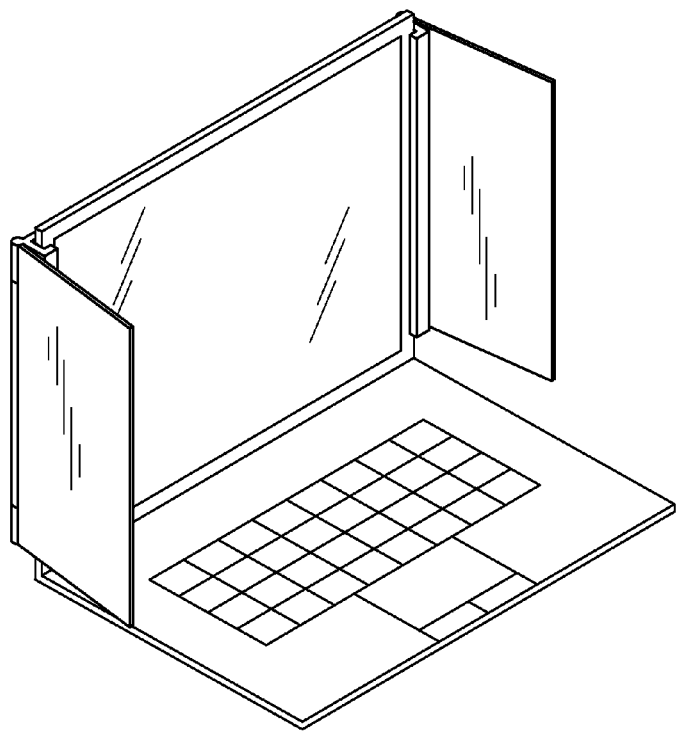
FIG. 2 is an in-use view of an embodiment of the disclosure.
Figure 3:
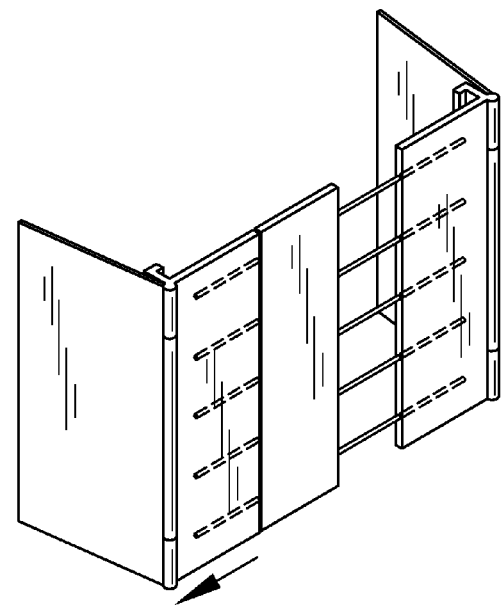
FIG. 3 is a rear, perspective view of an embodiment of the disclosure in use.

Directional references to the left wing 108 and right wing 109 are set when the each wing projects perpendicularly away from the screen 123 toward the front 141 of the computer 122 (as shown in FIG. 2). For example, the left 143 side of the right wing 109 is the side facing the screen 123; the back 142 side of the right wing 109 is attached to the right end hinge 116; the right 145 side of the left wing 108 is the side facing the screen 123; the back 142 side of the left wing 108 is attached to the left end hinge 112. Directional references to the left wing 108 and right wing 109 do not change when the relative position of the left wing 108 or the right wing 109 to the screen 123 is adjusted.

With respect to the above description, it is to be realized that the optimum dimensional relationship for the various components of the invention described above and in FIGS. 1 through 12, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which The inventor claims:

1. A privacy screen comprising:
  a plurality of wings, a left end structure, a right end structure, one or more adjustment structures, a plurality of connecting rods, and a plurality of holes;
  wherein the privacy screen is adapted for use with a computer;
  wherein the size of the privacy screen is adjustable;
  wherein the privacy screen uses a telescopic mechanism for adjustment;
  wherein the plurality of wings comprises a left wing and a right wing;
  wherein the left wing is attached to the left end;
  wherein the right wing is attached to the right end;
  wherein the left end structure comprises a left end panel, a left end hinge, a left end mounting clip, and a left end sub-plurality of holes;
  wherein the right end structure comprises a right end panel, a right end hinge, a right end mounting clip, and a right end sub-plurality of holes;
  wherein the left end mounting clip is formed into the left end panel;
  wherein the right end mounting clip is formed into the right end panel;
  wherein the left end hinge is attached to the left end panel;
  wherein the right end hinge is attached to the right end panel;
  wherein the left end sub-plurality of holes is formed in the left end panel;
  wherein the right end sub-plurality of holes is formed in the right end panel;
  wherein each of the holes from the left end sub-plurality of holes is designed and sized to receive one of the plurality of connecting rods;
  wherein each of the holes from the right end sub-plurality of holes is designed and sized to receive one of the plurality of connecting rods;
  wherein the left end mounting clip comprises a left end projection and a left end retaining clip;
  wherein the right end mounting clip comprises a right end projection and a right end retaining clip;
  wherein the left end projection projects perpendicularly away from the front face of the left end panel towards the front of the computer;
  wherein the right end projection projects perpendicularly away from the front face of the right end panel towards the front of the computer;
  wherein the left end projection is further defined by a first end and a second end;
  wherein the right end projection is further defined by a third end and a fourth end;
  wherein the first end of the left end projection is joined to the left end panel;
  wherein the third end of the right end projection is joined to the right end panel;
  wherein the left end retaining clip projects away from the second end of the left end projection towards the right end structure;
  wherein the right end retaining clip projects away from the fourth end of the right end projection towards the left end structure.

2. The privacy screen according to claim 1 wherein the span of the left end projection and the shape and relative position of the left end retaining clip are adapted to fit around the screen of the computer and serve to securely attach the privacy screen to the computer;
  wherein the span of the right end projection and the shape and relative position of the right end retaining clip are adapted to fit around the screen of the computer and serve to securely attach the privacy screen to the computer.

3. The privacy screen according to claim 2 wherein the left wing is attached to the left end hinge;
  wherein the right wing is attached to the right end hinge.

4. The privacy screen according to claim 3 wherein each of the one or more adjustment structures comprises a center panel that is formed with a first sub-plurality of holes and a second sub plurality of holes.

5. The privacy screen according to claim 4 wherein each of the holes from the first sub-plurality of holes is designed and sized to receive one of the plurality of connecting rods;
  wherein each of the holes from the second sub-plurality of holes is designed and sized to receive one of the plurality of connecting rods.

6. The privacy screen according to claim 5 wherein each of the plurality of connecting rods comprises a rod which is further defined with a fifth end and a sixth end;
  wherein the plurality of holes is defined as comprises the left end sub-plurality of holes, the right end sub-plurality of holes, and the first sub-plurality of holes and the second sub-plurality of holes of each of the one or more adjustment structures included with the privacy screen;
  wherein the fifth end of each connecting rod is inserted into a third sub-plurality of holes selected from the plurality of holes;
  wherein the sixth end of each of the plurality of connecting rods is inserted into a hole selected from a fourth sub-plurality of holes that is selected from the plurality of holes;
  wherein the fourth sub-plurality of holes is different from the third sub-plurality of holes;
  wherein the fifth end and sixth end of each of the plurality of connecting rods is inserted into one of the plurality of holes such that no two connecting rods cross over each other.

7. The privacy screen according to claim 6 wherein the plurality of wings further comprises an optional top wing.

8. The privacy screen according to claim 7 wherein at least one adjustment structure hinge is attached to a location selected from the group consisting of the left end structure, the right end structure, or an adjustment structure.

9. The privacy screen according to claim 8 wherein the top wing is attached to the adjustment structure hinge.

10. The privacy screen according to claim 6 wherein the one or more adjustment structures further comprises a first adjustment structure;
  wherein the first sub-plurality of holes of the first adjustment structure comprises five holes;
  wherein the first sub-plurality of holes of the first adjustment structure comprises five holes;
  wherein the left end sub-plurality of holes comprises five holes;
  wherein the right end sub-plurality of holes comprises five holes;
  wherein the plurality of connecting rods comprises ten connecting rods.

11. The privacy screen according to claim 6 wherein the one or more adjustment structures further comprises a second adjustment structure and a third adjustment structure;
- wherein the first sub-plurality of holes of the second adjustment structure comprises five holes;
- wherein the first sub-plurality of holes of the second adjustment structure comprises five holes;
- wherein the first sub-plurality of holes of the third adjustment structure comprises five holes;
- wherein the first sub-plurality of holes of the third adjustment structure comprises five holes;
- wherein the left end sub-plurality of holes comprises five holes;
- wherein the right end sub-plurality of holes comprises five holes;
- wherein the plurality of connecting rods comprises fifteen connecting rods.

12. The privacy screen according to claim 11 wherein the plurality of wings further comprises an optional top wing.

13. The privacy screen according to claim 12 wherein at least one adjustment structure hinge is attached to a location selected from the group consisting of the left end structure, the right end structure, the second adjustment structure or the third adjustment structure.

14. The privacy screen according to claim 13 wherein the top wing is attached to the adjustment structure hinge.

* * * * *